US012110172B2

(12) United States Patent
Tian et al.

(10) Patent No.: US 12,110,172 B2
(45) Date of Patent: Oct. 8, 2024

(54) APPARATUS AND METHOD OF OPERATING TWISTLOCKS AND ASSOCIATED ROBOT

(71) Applicant: ABB Schweiz AG, Baden (CH)

(72) Inventors: Ye Tian, Shanghai (CN); Jiafan Zhang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/248,012

(22) PCT Filed: Oct. 26, 2020

(86) PCT No.: PCT/CN2020/123635
§ 371 (c)(1),
(2) Date: Apr. 5, 2023

(87) PCT Pub. No.: WO2022/087780
PCT Pub. Date: May 5, 2022

(65) Prior Publication Data
US 2023/0382636 A1    Nov. 30, 2023

(51) Int. Cl.
*B65D 90/00* (2006.01)
*B25J 15/00* (2006.01)
*B25J 15/02* (2006.01)

(52) U.S. Cl.
CPC ........ *B65D 90/002* (2013.01); *B25J 15/0052* (2013.01); *B25J 15/0253* (2013.01); *B65D 2590/0033* (2013.01)

(58) Field of Classification Search
CPC .......... B65D 90/002; B65D 2590/0033; B63B 25/004; B25J 15/0052; B25J 15/0253
See application file for complete search history.

(56) References Cited

U.S. PATENT DOCUMENTS

2005/0127694 A1  6/2005  Petzitillo, Jr. et al.
2012/0039699 A1  2/2012  Ward

FOREIGN PATENT DOCUMENTS

CN    105312888 A  *  2/2016
CN    105880989 A  *  8/2016
(Continued)

OTHER PUBLICATIONS

CN105880989A; Tang et al.; Automatic loading and unloading machine for container twist locks and system with automatic loading and unloading machine; EPO English Machine Translation; pp. 1-7 (Year: 2016).*

*Primary Examiner* — Bayan Salone
(74) *Attorney, Agent, or Firm* — Greenberg Traurig, LLP (57) ABSTRACT

Embodiments of the present disclosure provide an apparatus and a method for operating a pair of twistlocks and an associated robot. The apparatus comprises a first component adapted to clamp a first twistlock to allow the clamped first twistlock to be removed from a container; and a second component arranged adjacent to the first component and adapted to clamp a second twistlock to allow the clamped second twistlock to be removed from a container; or receive the first twistlock released from the first component to allow the first component to clamp the second twistlock. With the first and second components, the pair of twistlocks, especially mid-type twistlocks, can be operated more quickly with less operation steps. In this way, the operation efficiency for operating the mid-type twistlocks can be significantly improved with lower costs.

19 Claims, 11 Drawing Sheets

(56) References Cited

FOREIGN PATENT DOCUMENTS

| CN | 106829246 A | * | 6/2017 | |
|----|-------------|---|--------|--|
| CN | 107857134 A | * | 3/2018 | .............. B23P 19/00 |
| CN | 208307508 U | * | 1/2019 | ........... B65D 88/121 |
| WO | WO-2012141658 A2 | * | 10/2012 | ........... B65D 90/002 |

* cited by examiner

APPARATUS AND METHOD OF OPERATING TWISTLOCKS AND ASSOCIATED ROBOT

CROSS-REFERENCE TO RELATED APPLICATIONS

This is a national stage application claiming priority to International patent application Serial No.: PCT/CN2020/123635, filed on Oct. 26, 2020; which is herein incorporated by reference in its entirety.

FIELD

Embodiments of the present disclosure generally relate to a robot, and more specifically, to an apparatus and a method of operating a pair of twistlocks using a robot.

BACKGROUND

A twistlock and corner casting together form a standardized rotating connector for securing shipping containers. The primary uses of twistlocks are for locking stacked containers on a container ship.

Many types of twistlocks, such as manual twistlocks, semi-automatic twistlocks or fully automatic twistlocks, can be used between the containers in a stack. "In the stack" means that there will be a container both above and below the twistlock. Each type of twistlock has many different structures. It is tedious and dangerous work to install or remove the twistlock on or from the container.

To perform the tedious and dangerous work safely and efficiently, some automated twistlock handling robots have been proposed. WO2012141658A2 discloses an automatic stevedore remote station having a camera that can detect the presence, distance, shape and orientation of a twistlock via machine vision. The automatic stevedore remote station also has a gripper and a twister which can move to the detected twistlock and remove/install the twistlock from/onto a shipping container. The automatic stevedore remote station is provided in the form of an industrial robot that can move both the camera and its end effector together.

SUMMARY

Embodiments of the present disclosure provide an apparatus and a method for operating a pair of twistlocks and an associated robot, to at least in part solve the above and other potential problems.

A first aspect is an apparatus for operating a pair of twistlocks. The apparatus comprises a first component adapted to clamp a first twistlock to allow the clamped first twistlock to be removed from a container; and a second component arranged adjacent to the first component and adapted to clamp a second twistlock to allow the clamped second twistlock to be removed from a container; or receive the first twistlock released from the first component to allow the first component to clamp the second twistlock.

With the first and second components, the pair of twistlocks, especially mid-type twistlocks, can be operated more quickly with fewer operation steps. In this way, the operating efficiency for operating the mid-type twistlocks can be significantly improved with lower costs.

In some embodiments, the apparatus comprises an engaging component coupled to a robot and adapted to operate the first and second twistlocks, the engaging component adapted to arrange the first and second components thereon alongside one another. This arrangement can allow simultaneous clamping of the first and second mid-type twistlocks, further improving the operating efficiency.

In some embodiments, a distance between the first and second components is adjustable. In this way, the apparatus can be applied to various types of containers, thereby increasing the applicability of the apparatus.

In some embodiments, the apparatus further comprises a guide adapted to arrange the first and second components thereon; and a first driving component adapted to move at least one of the first and second components along the guide to adjust the distance between the first and second components. This arrangement can more easily accomplish the operations of the assembly.

In some embodiments, the apparatus further comprises an engaging component coupled to a robot and adapted to operate the first and second twistlocks, the engaging component comprising a mounting surface for mounting the first and second components oriented in opposite directions. In this way, the apparatus can operate the pair of mid-type twistlocks quickly with a simple and easily achievable structure.

In some embodiments, the engaging component is adapted to be driven to rotate about an axis perpendicular to the mounting surface to allow the first and second components to clamp the first and second twistlocks sequentially. This arrangement allows the apparatus to operate a pair of twistlocks in a relatively simple manner.

In some embodiments, the apparatus further comprises a rotating base coupled to the engaging component and adapted to arrange the first and second components thereon; and a second driving component arranged on the engaging component and adapted to drive the rotating base to rotate to allow the first and second components to sequentially clamp the first and second twistlocks. This arrangement can improve the flexibility of the apparatus.

In some embodiments, the second component comprises a storage portion adapted to temporarily store the first twistlock released from the first component to allow the first component to clamp the second twistlock. This arrangement allows faster operation with fewer clamping devices.

In some embodiments, the storage portion is arranged with respect to the first component such that the first twistlock released from the first component drops in the storage portion by gravity. In this way, the pair of twistlocks can be operated more easily.

In a second aspect, a method of operating a pair of twistlocks is provided. The method comprises operating a first component to clamp a first twistlock to remove the clamped first twistlock from a container; and operating a second component to clamp the second twistlock to allow the clamped second twistlock to be removed from a container; or to receive the first twistlock released from the first component to allow the first component to clamp the second twistlock.

In some embodiments, the first and second component is operated to clamp the first and second twistlocks simultaneously.

In some embodiments, the method further comprises, prior to operating the second component, rotating the first and second components to cause the second component to orient towards the second twistlock.

In some embodiments, the method further comprises operating the first component to release the first twistlock to allow the second component to receive the first twistlock.

In a third aspect, a robot for operating a pair of twistlocks is provided. The robot comprises an apparatus as mentioned in the first aspect.

It is to be understood that the Summary is not intended to identify key or essential features of embodiments of the present disclosure, nor is it intended to be used to limit the scope of the present disclosure. Other features of the present disclosure will become readily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, the same reference numerals usually represent the same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

For a long time, the handling of twistlocks and semi-automated twistlocks has been a heavy burden for the container industry. The burden consists of the operational cost to place and remove these twistlocks in every step of the container supply chain (on the vessel, on road trucks and on trains). Moreover, the handling typically takes place in areas of dense traffic, such as the apron of a container terminal, or in locations where inherently unsafe activities take place, such as in the hold of the vessel, or close to moving containers. It is therefore often a source of injuries or casualties.

According to the locations of twistlocks on the truck for transporting containers, there are typically two types of twistlocks, namely, mid-type twistlocks and side-type twistlocks. For ISO 40 feet containers, only four side-type twistlocks need to be arranged on the four lower corners of a container. For ISO 20 feet containers, the truck typically can carry two containers side by side with a floating distance therebetween. In this situation, each of the two containers is fixed on the truck with twistlocks at lower corners of the containers. The twistlocks arranged at lower corners of one container adjacent to another container are mid-type twistlocks. The twistlocks arranged at lower corners of one container away from another container, typically at the front and rear ends of the truck's load platform, are side-type twistlocks.

The mid-type twistlocks and side type twistlocks are typically operated by different robots. It is to be appreciated that "operate" here means removing twistlocks from a container or installing a twistlock on a container. Embodiments of the present disclosure will be described mainly by taking the removal of the twistlocks from a container as an example. It is to be understood that other operating conditions are similar, and will not be described in detail below.

Figure 1:
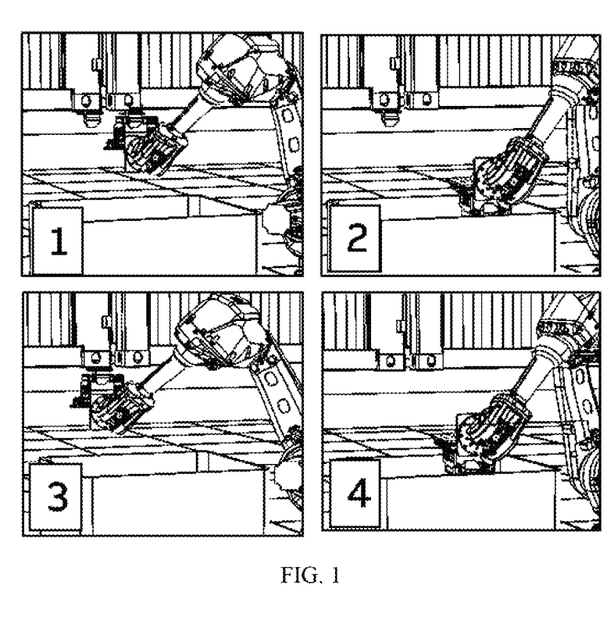
FIG. 1 shows perspective views of operation processes of a conventional apparatus for operating a pair of twistlocks.

In order to efficiently operate mid-type twistlocks, the mid-type twistlocks arranged on one side of adjacent containers are usually operated separately by two robots. Each robot operates a mid-type twistlock on a corresponding container, which results in an increase in cost. In order to reduce costs, conventional solutions also include the use of one robot to operate a pair of mid-type twistlocks arranged on one side of adjacent containers. FIG. 1 shows perspective views of operation processes of operating the pair of twistlocks with one robot. As shown in FIG. 1, in operating the mid-type twistlocks, the robot operates the apparatus to clamp a mid-type twistlock and remove the clamped mid-type twistlock from a container.

Before operating the next mid-type twistlock, the robot must first release the clamped mid-type twistlock which has been removed from the container to a predetermined location because the conventional apparatus only has one operating component for operating the mid-type twistlock. The step of releasing the clamped twistlock will inevitably lead to a prolonged operation process and reduce the efficiency of operating the twistlock.

In order to at least partially address the above and other potential problems, embodiments of the present disclosure provide an apparatus 100 for operating a pair of twistlocks with improved operating efficiency. In some embodiments, the pair of twistlocks may refer to mid-type twistlocks as mentioned above. In some embodiments, the apparatus 100 according to embodiments of the present disclosure may also be used to operate other types of twistlock pairs as long as a distance between a pair of twistlocks allows one robot to operate them. Embodiments of the present disclosure will be described mainly by taking mid-type twistlocks as an example. It is to be understood that operating other types of twistlock pairs with the apparatus 100 is similar, and will not be described in detail below.

Figure 2:
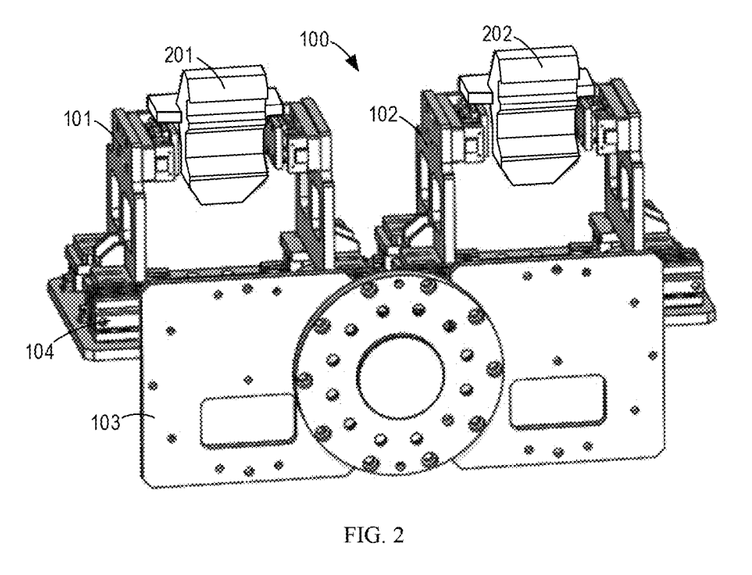
FIG. 2 shows a perspective view of an apparatus for operating a pair of twistlocks according to embodiments of the present disclosure.
Figure 3:
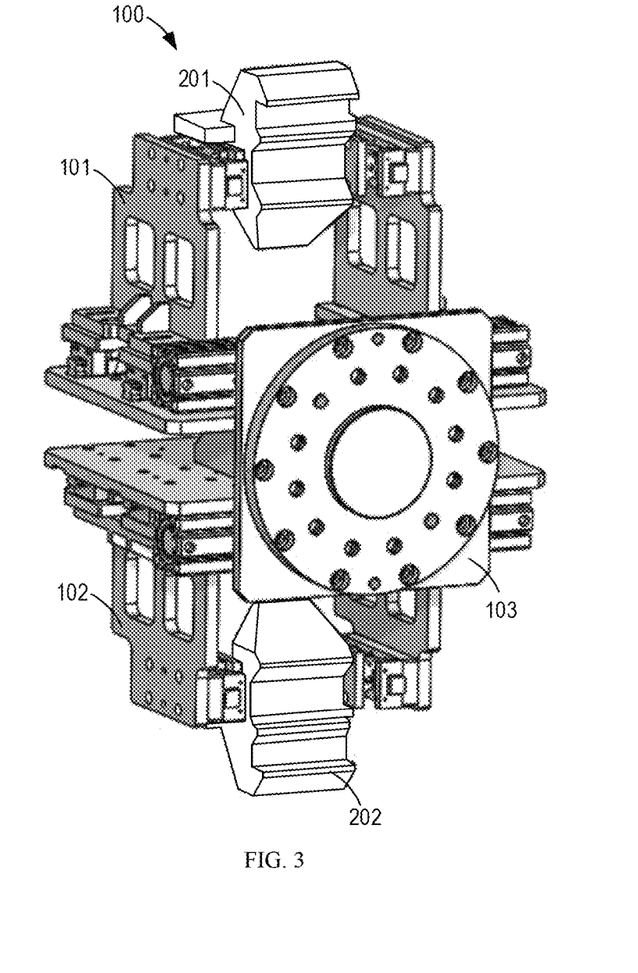
FIG. 3 shows a perspective view of an apparatus for operating a pair of twistlocks according to further embodiments of the present disclosure.
Figure 4:
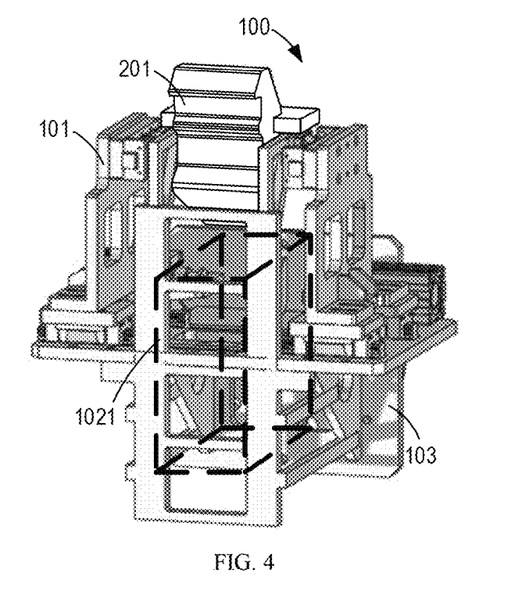
FIGS. 4 and 5 show perspective views of an apparatus for operating a pair of twistlocks according to further embodiments of the present disclosure.

FIGS. 2-4 show perspective views of an apparatus 100 for operating a pair of twistlocks according to different embodiments of the present disclosure. As shown in FIGS. 2-4, generally, the apparatus 100 according to embodiments of the present disclosure comprises two components, namely a first component 101 and a second component 102, to allow the apparatus 100 to operate a pair of twistlocks simultaneously or sequentially, instead of having to release one of the twistlocks at a predetermined location before operating the other. In this way, the efficiency for operating the pair of twistlocks can be significantly improved.

Figure 5:
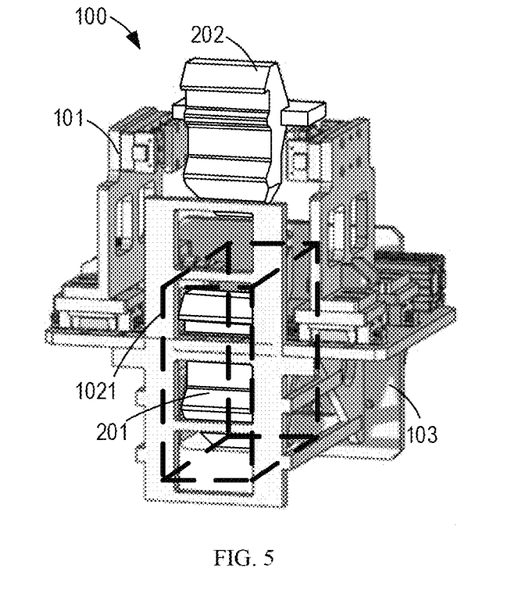

The first component 101 is adapted to clamp one of the pair of twistlocks, namely a first twistlock 201 to allow the clamped first twistlock 201 to be removed from a container 203. The second component 102 is arranged adjacent to the first component 101. In some embodiments, as shown in FIGS. 2 and 3, the second component 102 can clamp a second twistlock 202 to allow the clamped second twistlock 202 to be removed from a container 203. In some alternative embodiments, as shown in FIGS. 4 and 5, the second component 102 also can receive the first twistlock 201 released from the first component 101. As a result, the first component 101 is no longer occupied by the first twistlock 201 and thus can clamp and remove the second twistlock 202.

In the following, some example arrangements of the apparatus 100 according to embodiments of the present disclosure will be described in detail with reference to FIGS. 2-5. As shown in FIG. 2, in some embodiments, the first and second components 101, 102 are both used to clamp the twistlocks. In those embodiments, the apparatus 100 further comprises an engaging component 103 which is adapted to be coupled to a robot 300 for operating the first and second twistlocks 201, 202. The first and second components 101, 102 as mentioned above can be arranged on the engaging component 103 alongside one another.

In this way, the first and second components 101, 102 are able to clamp the first and second twistlocks 201, 202 simultaneously. For example, in some embodiments, by aligning the first and second component 102 to the corresponding twistlocks, the first and second components 101, 102 can clamp the twistlocks simultaneously.

In some embodiments, the first and/or second components 101, 102 may have certain degrees of freedom, including degrees of translational freedom and degrees of rotational freedom. For example, in some embodiments, besides the degree of freedom for opening or closing grippers of the first or second component 102, at least one of the first and second components 101, 102 may also have a degree of translational freedom to allow the adjustable distance between the first and second components 101, 102. In this way, the apparatus 100 can be applied to various types of twistlocks with varied distances.

In some embodiments, as shown in FIG. 2, the apparatus 100 further comprises a guide 104 and a driving component, namely a first driving component. The first and second components 101, 102 may be arranged on the guide 104 and can slide along the guide 104 with the driving of the first driving component. That is, the first driving component can move the first and/or second components 101, 102 along the guide 104. In this way, the distance between the first and second components 101, 102 can be adjusted.

In some embodiments, the apparatus may also comprise at least one sensor to obtain information about the distance between the first and second components 101, 102. For example, the apparatus 100 may comprise a laser ranging sensor to obtain the distance between the first and second components 101, 102. In this way, the first and second components 101, 102 may be moved so that the distance therebetween is consistent with the distance between the two twistlocks. Of course, the laser ranging sensor is merely illustrative and is not intended to limit the scope of the present disclosure. Any other suitable arrangements or sensors are possible. For example, in some alternative embodiments, the sensor may also be an encoder on a motor used to drive the first and second components 101, 102 to move, and the controller may obtain information about the distance between the components through conversion.

In addition to the above mentioned degrees of freedom, the first and/or second components 101, 102 may also have other degrees of freedom. For example, the first and/or second components 101, 102 can have at least six degrees of freedom to allow the first or second component 102 to remove the corresponding twistlock by translating or rotating the clamped twistlock about different axes. In this way, the apparatus 100 can be operated more flexibly and in a way that possible interference of the robot 300 to containers 203 is prevented, etc., during the operation of the twistlocks, so that the apparatus 100 can be applied to more situations.

In some alterative embodiments, the apparatus 100 may also sequentially clamp the first and second twistlocks 201, 202. Specifically, as shown in FIG. 3, in some embodiments, the engaging component 103 comprises a mounting surface for mounting the first and second components 101, 102 which are oriented in opposite directions. In this way, after the first component 101 clamps and removes the first twistlock 201, the first and second components 101, 102 can be rotated about an axis perpendicular to the mounting surface to allow the second component 102 to clamp the second twistlock 202.

For example, in some embodiments, the engaging component 103 can be driven by the robot 300 to rotate about the axis perpendicular to the mounting surface. In this way, the first and second components 101, 102 can be rotated with the engaging component 103, so that the second component 102 is oriented towards the second twistlock 202 to allow the second component 102 to clamp the second twistlock 202.

It is to be understood that the above embodiments where the first and second components 101, 102 are rotated with the engaging component 103 are merely for illustrative purposes, without suggesting any limitation as to the scope of the present disclosure. Other arrangements are also possible. For example, in some alternative embodiments, the apparatus 100 may further comprise a rotating base and a second driving component. The first and second components 101, 102 are arranged on the engaging component 103 via the rotating base. That is, in those embodiments, the engaging component 103 may not rotate but the rotating base rotates to drive the first and second components 101, 102. The second driving component may be arranged on the engaging component 103 and can drive the rotating base, so that the first and second components 101, 102 can be rotated with the rotating base. This arrangement can make the arrangement of the apparatus 100 more flexible to adapt to various needs.

It should also be understood that the above embodiments where the first and second components 101, 102 are arranged oppositely are merely for illustrative purposes, without suggesting any limitation as to the scope of the present disclosure. Other arrangements are also possible. For example, in some alternative embodiments, the first and second components 101, 102 can have angles other than 0° and 180°, such as 120°, to adapt to more situations.

The above embodiments of the present disclosure show that the first and second components 101, 102 can achieve the same function, i.e., can clamp the first and second twistlocks 201, 202 simultaneously or sequentially. Alternatively or additionally, in some embodiments, the first and second components 101, 102 can achieve different functions, respectively. For example, as mentioned above, in some embodiments, instead of clamping the second twistlock 202, the second component 102 can be arranged to receive the first twistlock 201 released from the first component 101.

To this end, in some embodiments, as shown in FIGS. 4 and 5, the second component 102 comprises a storage portion 1021. The storage portion 1021 can temporarily store the first twistlock 201 released from the first component 101, so that the first component 101 is able to clamp the second twistlock 202. After the second twistlock 202 is clamped by the first component 101, the clamped second twistlock 202 and the first twistlock 201 stored in the storage portion 1021 can be released to a predetermined location.

In some embodiments, the storage portion 1021 may be a chamber formed inside the first component 101. When the clamped first twistlock 201 is removed from the corresponding container 203, grippers of the first component 101 may be operated to open to release the first twistlock 201. The storage portion 1021 may be arranged with respect to the first component 101 such that the first twistlock 201 released from the first component 101 can drop in the storage portion 1021 by gravity. In this way, the first component 101 is able to clamp the second twistlock 202, so that the apparatus 100 can operate the first and second twistlocks 201, 202 sequentially, instead of having to first release the first twistlock 201 at a predetermined location before operating the second twistlock 202, thereby improving the operating efficiency.

It should be understood that the above embodiments where the first twistlock 201 drops in the storage portion 1021 by gravity are merely for illustrative purposes, without suggesting any limitation as to the scope of the present disclosure. Other arrangements are also possible. For example, in some alternative embodiments, an elastic mechanism may be arranged in the storage component. The first twistlock 201 released by the first component 101 may also be received in the storage portion 1021 by elastic force provided by the elastic mechanism.

Figure 6:
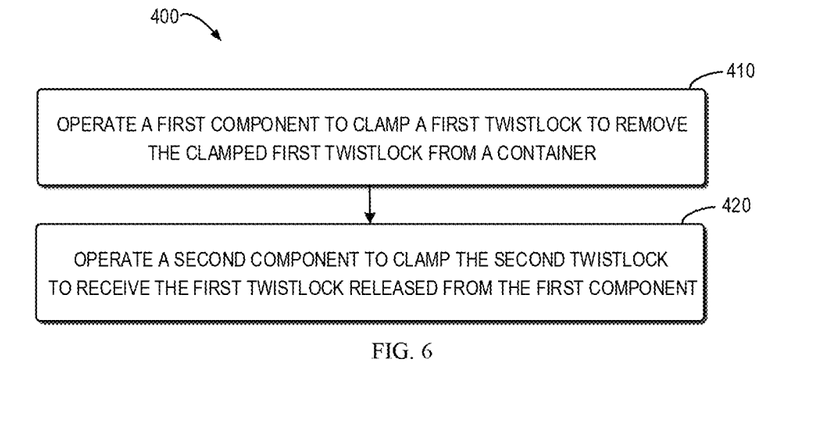
FIG. 6 shows a flowchart illustrating a method of operating a pair of twistlocks with a robot according to embodiments of the present disclosure

The above content describes some example arrangements of the apparatus 100 according to embodiments of the present disclosure. According to other aspects of the present disclosure, a method of operating a pair of twistlocks with a robot 300 is provided. FIG. 6 shows a flowchart illustrating a method of operating a pair of twistlocks with the robot 300. The method can be implemented as program codes stored in a memory, which can be performed by a controller of the robot 300 or any other suitable controller or processor.

At block 410, the robot 300 operates the first component 101 to clamp the first twistlock 201 to remove the clamped first twistlock 201 from a container 203, for example, by translating or rotating the clamped first twistlock 201 about different axes. At block 420, simultaneously or sequentially, the robot 300 operates the second component 102 to clamp the second twistlock 202 to allow the clamped second twistlock 202 to be removed from a container 203, or the robot 300 can also operate the second component 102 to receive the first twistlock 201 to allow the first component 101 to clamp the second twistlock 202. With the above mentioned method, the robot 300 can operate the pair of twistlocks simultaneously or sequentially, instead of having to first release the first twistlock 201 at a predetermined location before operating the second twistlock 202, thereby improving the operating efficiency.

Figure 7:
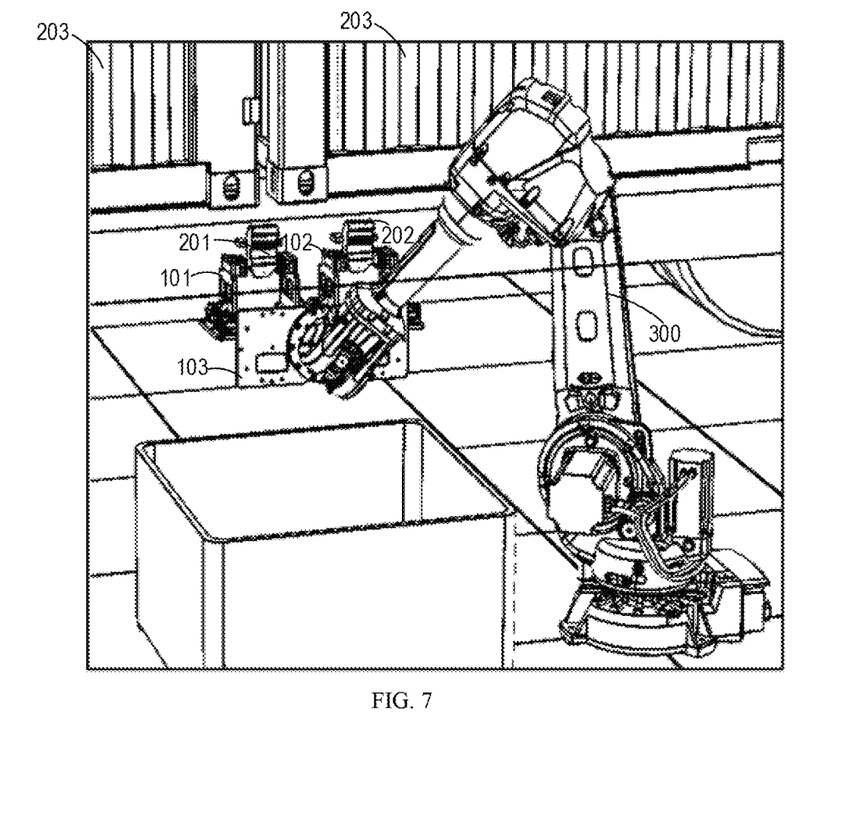
FIGS. 7 and 8 show perspective views of an apparatus for operating a pair of twistlocks with a robot according to embodiments of the present disclosure.
Figure 8:
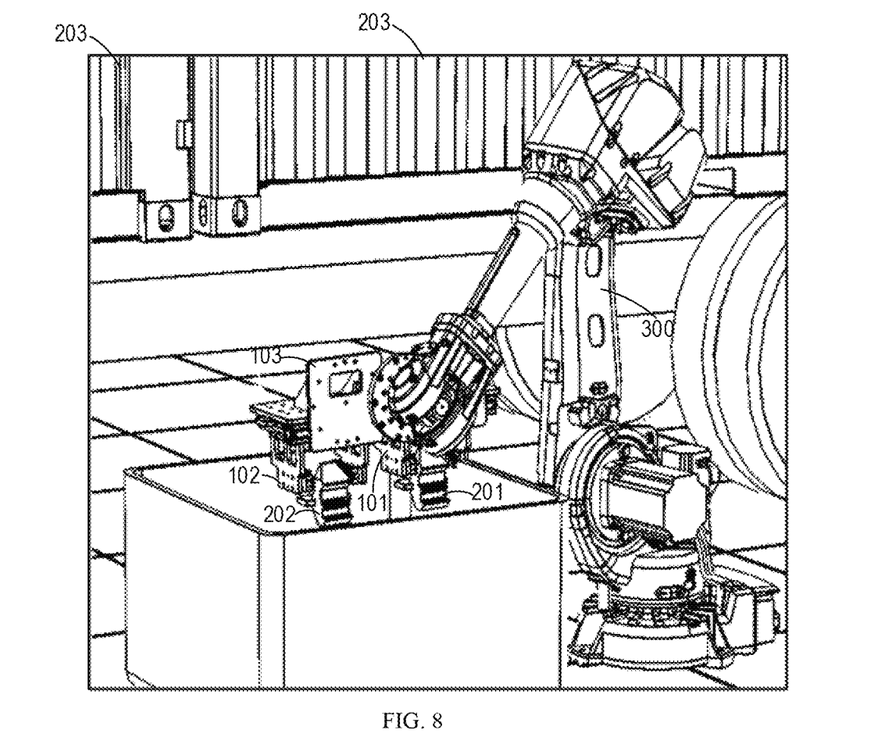

The method of operating the first and second twistlocks 201, 202 by the apparatus 100 according to embodiments of the present disclosure will be described in detail below in conjunction with FIGS. 7-14. Referring now to FIGS. 7 and 8 which show the operation processes of the apparatus 100 as shown in FIG. 2, in the embodiments where the first and second components 101, 102 are arranged alongside one another, the first and second components 101, 102 can be operated to clamp the first and second twistlocks 201, 202 simultaneously.

Specifically, as shown in FIG. 7, the first and second components 101, 102 may be adjusted so that the distance therebetween is the same as the distance between the first and second twistlocks 201, 202. As a result, the first and second components 101, 102 are aligned with the corresponding first and second twistlocks 201, 202, respectively. Then the first and second components 101, 102 can be operated to clamp and remove the first and second twistlocks 201, 202. After that, as shown in FIG. 8, the apparatus 100 may be moved to a predetermined location to release the clamped first and second twistlocks 201, 202 in a storage box at the predetermined location, for example.

It can be seen from the above that in comparison to the operation processes of the conventional apparatus 100 as shown in FIG. 1, which needs at least four steps to remove and release the first and second components 101, 102, the apparatus 100 according to embodiments of the present disclosure can achieve the above purposes with two steps, as shown in FIGS. 7 and 8. In this way, the operation efficiency for operating the pair of twistlocks is significantly improved.

Figure 9:
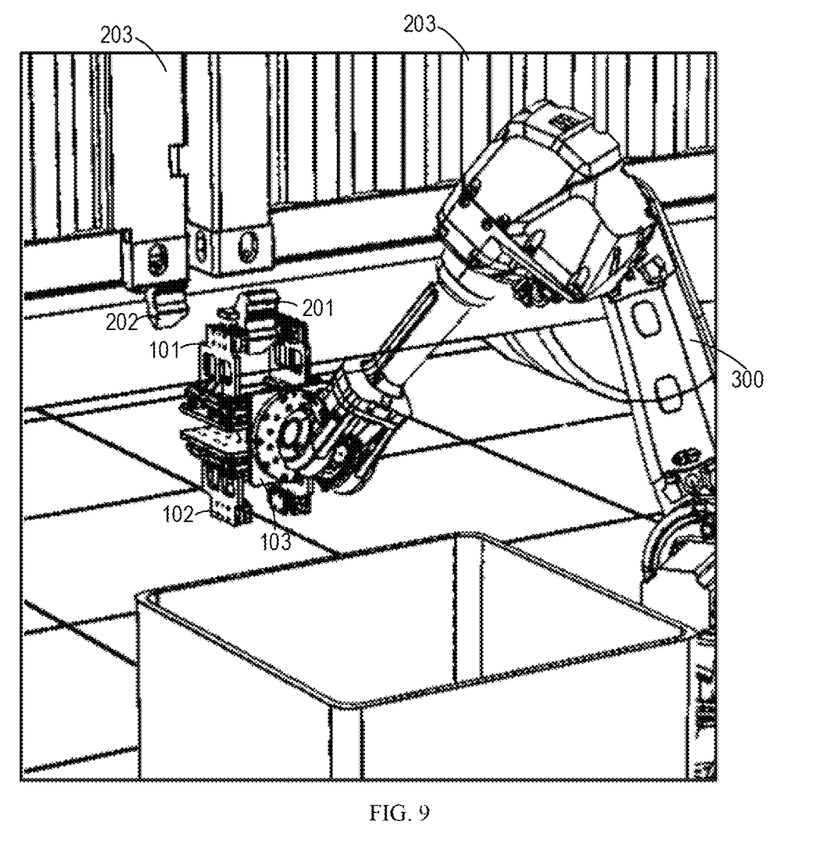
FIGS. 9-11 show perspective views of an apparatus for operating a pair of twistlocks with a robot according to further embodiments of the present disclosure.
Figure 10:
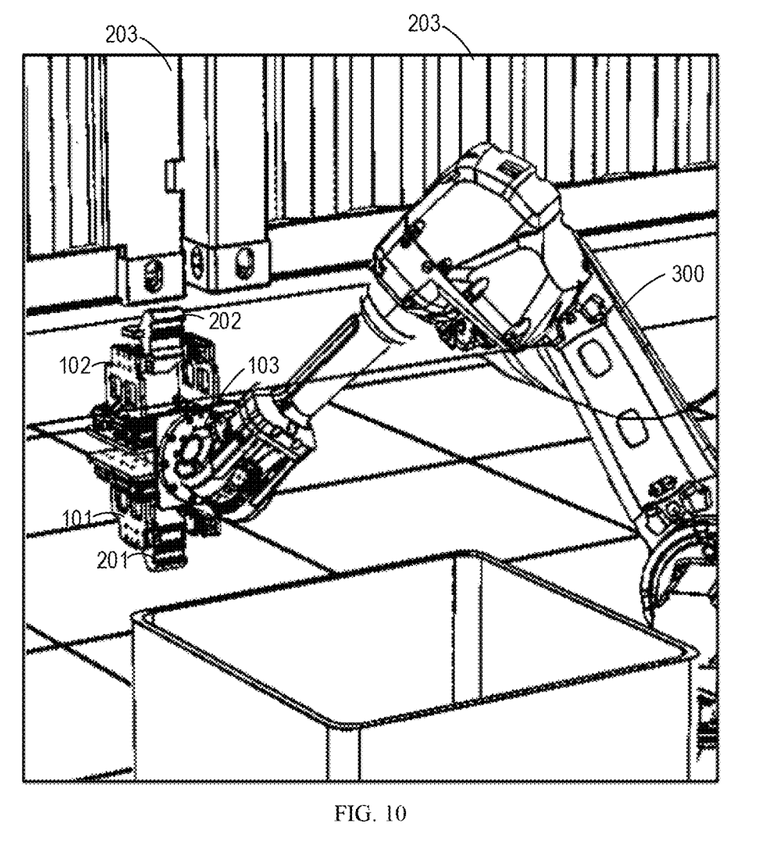
Figure 11:
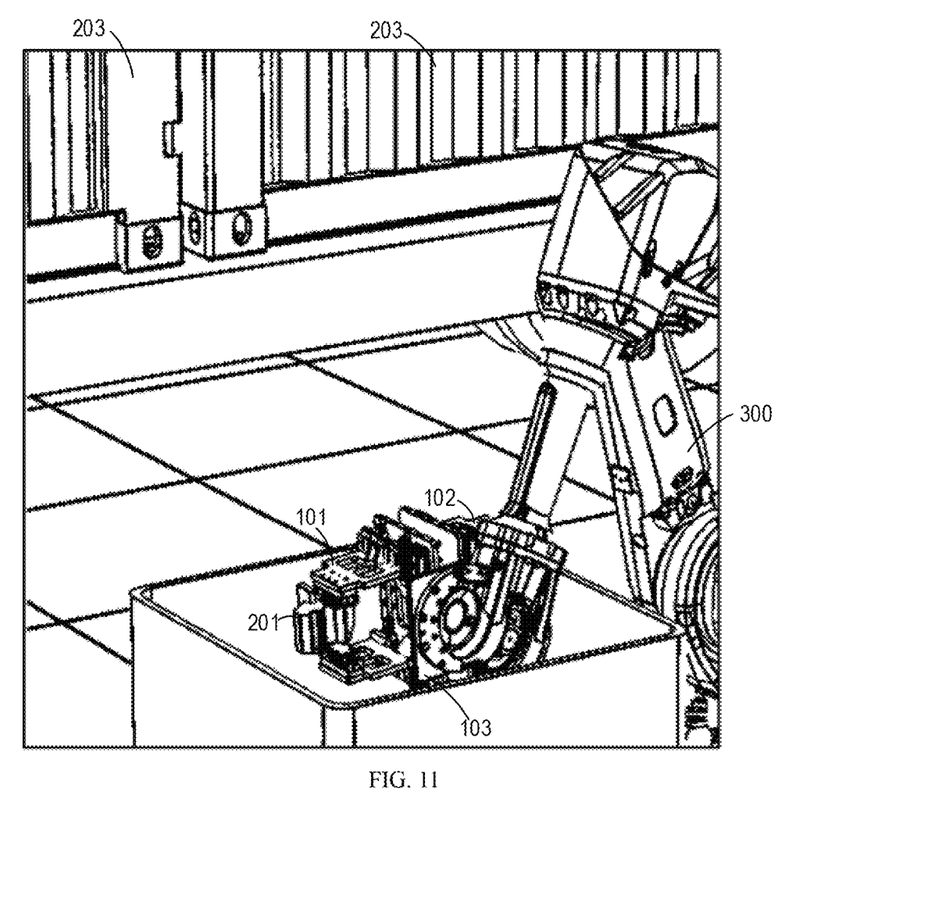

Referring now to FIGS. 9-11 which show the operation processes of the apparatus 100 as shown in FIG. 3, in the embodiments where the first and second components 101, 102 are arranged oppositely, the first and second components 101, 102 can be operated to clamp the first and second twistlocks 201, 202 sequentially.

Specifically, as shown in FIG. 9, the first component 101 is operated to clamp and remove the first twistlock 201. Then the apparatus 100 is rotated to allow the second component 102 to be oriented towards and align to the second twistlock 202, so that the second component 102 can clamp and remove the second twistlock 202, as shown in FIG. After that, as shown in FIG. 11, the apparatus 100 may be moved to a predetermined location, so that the clamped first and second twistlocks 201, 202 can be released in a storage box at the predetermined location, for example.

In comparison to at least four steps of the conventional apparatus 100 as shown in FIG. 1 to remove and release the first and second components 101, 102, the apparatus 100 according to embodiments of the present disclosure can achieve the above purposes with three steps with a structure that is easily achieved, as shown in FIGS. 9-11. As a result, operating efficiency can be improved with a simplified structure.

Figure 12:
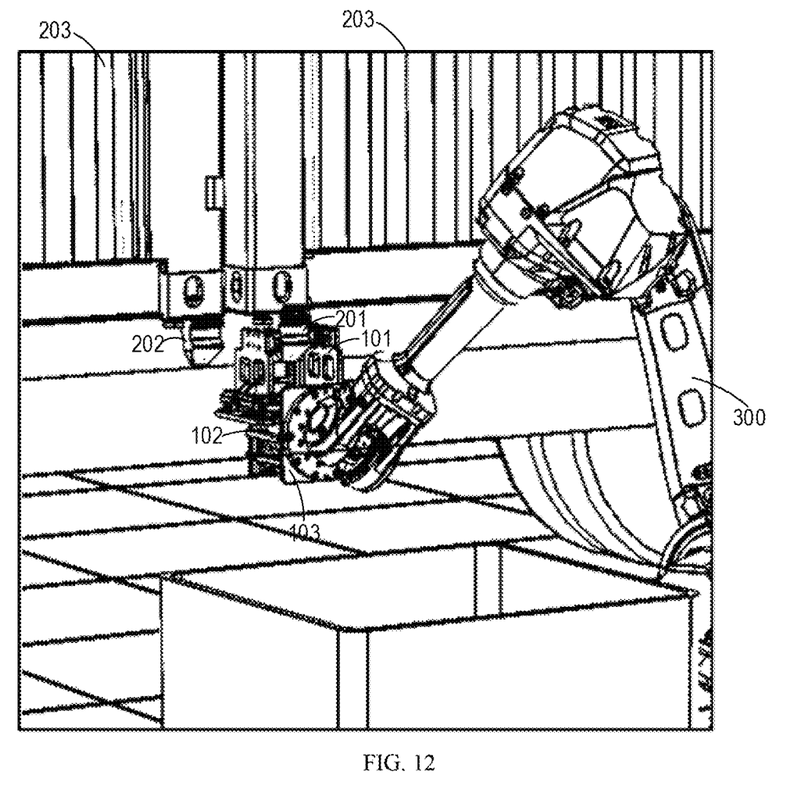
FIGS. 12-14 show perspective views of an apparatus for operating a pair of twistlocks with a robot according to further embodiments of the present disclosure.
Figure 13:
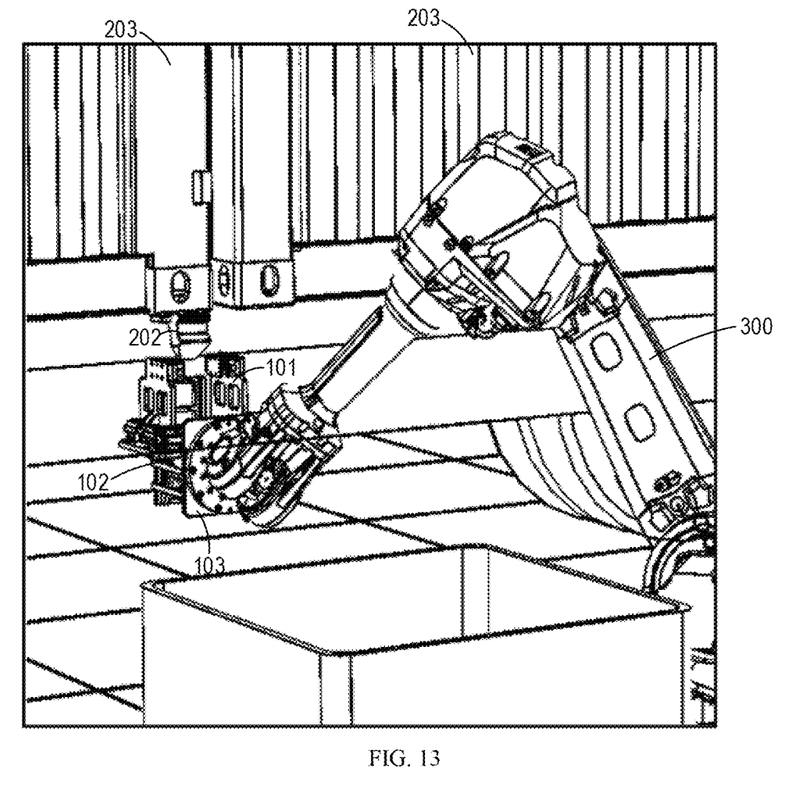
Figure 14:
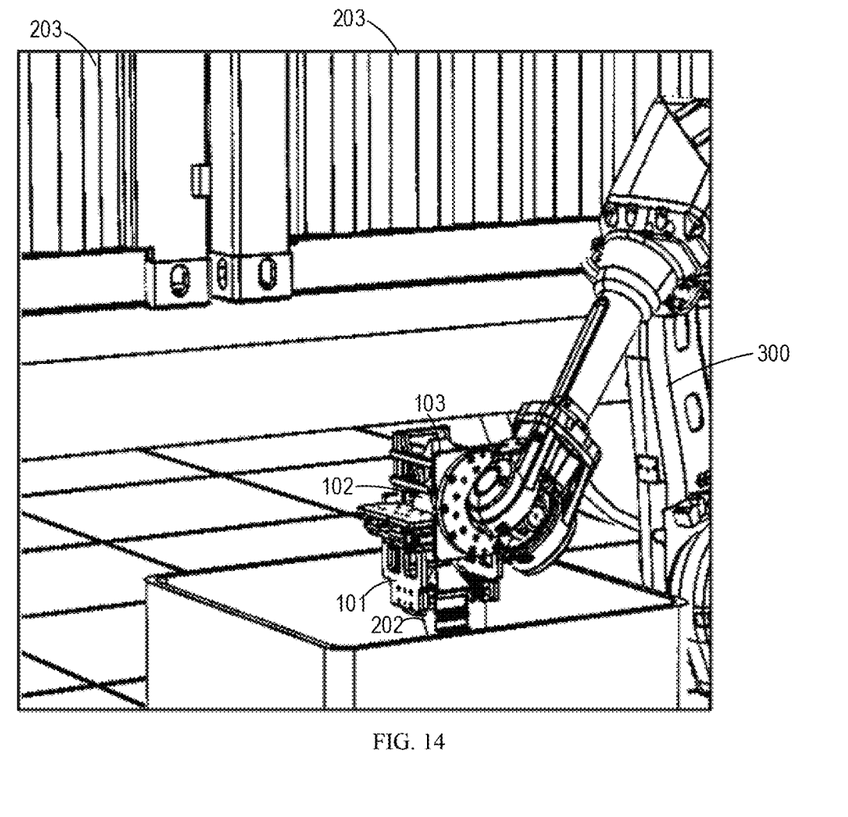

Referring now to FIGS. 12-14 which show the operation processes of the apparatus 100 as shown in FIGS. 4 and 5, in the embodiments where the second component 102 can receive the first twistlock 201 released from the first component 101, the first component 101 can be operated to clamp the first and second twistlocks 201, 202 sequentially.

Specifically, as shown in FIG. 12, the first component 101 is operated to clamp and remove the first twistlock 201. Then the first component 101 is operated so that the grippers thereof are opened to allow the first twistlock 201 to drop in the storage portion 1021 of the second component 102 by gravity. Simultaneously, the apparatus 100 may be moved to a position where the first component 101 is aligned to the second twistlock 202, as shown in FIG. 13. The first component 101 can then clamp and remove the second twistlock 202 from a container 203. After that, as shown in FIG. 14, the apparatus 100 may be moved to a predetermined location, so that the clamped second twistlock 202 and the first twistlock 201 stored in the storage portion 1021 can be released in a storage box at the predetermined location.

In comparison to at least four steps of the conventional apparatus as shown in FIG. 1 to remove and release the first and second components 101, 102, the apparatus according to embodiments of the present disclosure can achieve the above purposes with three steps with arrangements that can be easily achieved, as shown in FIGS. 12-14. As a result, the operating efficiency can be improved with a simplified arrangement.

Embodiments of the present disclosure further disclose a robot 300. The robot 300 comprises the apparatus 100 as mentioned above. With the apparatus 100, the robot 300 can operate the pair of twistlocks simultaneously and sequentially. In this way, the operating efficiency is significantly improved.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for operating a pair of twistlocks, comprising:
   a first component adapted to clamp a first twistlock to allow the clamped first twistlock to be removed from a first container; and
   a second component arranged adjacent to the first component and adapted to clamp a second twistlock to allow the clamped second twistlock to be removed from a second container, wherein the first component and the second component are adapted to be operated simultaneously, or receive the first twistlock released from the first component to allow the first component to clamp the second twistlock to be removed from the second container.

2. The apparatus of claim 1, further comprising:
   an engaging component coupled to a robot and adapted to operate the first and second twistlocks, the engaging component adapted to arrange the first and second components thereon alongside one another.

3. The apparatus of claim 2, wherein a distance between the first and second components is adjustable.

4. The apparatus of claim 3, further comprising:
   a guide adapted to arrange the first and second components thereon; and
   a first driving component adapted to move at least one of the first and second components along the guide to adjust the distance between the first and second components.

5. The apparatus of claim 1, further comprising:
   an engaging component coupled to a robot and adapted to operate the first and second twistlocks, the engaging component comprising a mounting surface for mounting the first and second components oriented in opposite directions.

6. The apparatus of claim 1, wherein the second component comprises:
   a storage portion adapted to temporarily store the first twistlock released from the first component to allow the first component to clamp the second twistlock.

7. The apparatus of claim 6, wherein the storage portion is arranged with respect to the first component such that the first twistlock released from the first component drops in the storage portion by gravity.

8. A method of operating a pair of twistlocks, comprising:
   operating a first component to clamp a first twistlock to remove the first twistlock from a first container; and
   operating a second component
      to clamp a second twistlock to allow the second twistlock
      to be removed from a second container, wherein the first and second component is operated to clamp the first and second twistlocks simultaneously, or
      to receive the first twistlock released from the first component to allow the first component to clamp the second twistlock.

9. The method of claim 8, further comprising, prior to operating the second component, rotating the first and second components to cause the second component to orient towards the second twistlock.

10. The method of claim 8, further comprising:
    operating the first component to release the first twistlock to allow the second component to receive the first twistlock.

11. A robot for operating a pair of twistlocks, comprising the apparatus of claim 1.

12. The apparatus of claim 2, wherein the second component comprises:
    a storage portion adapted to temporarily store the first twistlock released from the first component to allow the first component to clamp the second twistlock.

13. The apparatus of claim 3, wherein the second component comprises:
    a storage portion adapted to temporarily store the first twistlock released from the first component to allow the first component to clamp the second twistlock.

14. The apparatus of claim 4, wherein the second component comprises:
    a storage portion adapted to temporarily store the first twistlock released from the first component to allow the first component to clamp the second twistlock.

15. The apparatus of claim 5, wherein the second component comprises:
    a storage portion adapted to temporarily store the first twistlock released from the first component to allow the first component to clamp the second twistlock.

16. An apparatus for operating a pair of twistlocks, comprising:
    a first component adapted to clamp a first twistlock to allow the clamped first twistlock to be removed from a first container;
    a second component arranged adjacent to the first component and adapted to clamp a second twistlock to allow the clamped second twistlock to be removed from a second container;
    an engaging component coupled to a robot and adapted to operate the first twistlock and the second twistlock, wherein the engaging component includes:
       a mounting surface for mounting the first component and the second component oriented in opposite directions, wherein the engaging component is adapted to be driven to rotate about an axis perpendicular to the mounting surface to allow the first component and the second component to sequentially clamp the first twistlock and the second twistlock, respectively.

17. An apparatus for operating a pair of twistlocks, comprising:
   a first component adapted to clamp a first twistlock to allow the clamped first twistlock to be removed from a first container;
   a second component arranged adjacent to the first component and adapted to clamp a second twistlock to allow the clamped second twistlock to be removed from a second container;
   an engaging component coupled to a robot and adapted to operate the first twistlock and the second twistlock, wherein the engaging component includes:
      a mounting surface for mounting the first component and the second component oriented in opposite directions;
      a rotating base coupled to the engaging component and adapted to arrange the first component and the second component thereon; and
      a second driving component arranged on the engaging component and adapted to drive the rotating base to rotate to allow the first component and the second component to sequentially clamp the first twistlock and the second twistlock, respectively.

18. The apparatus of claim 16, wherein the second component comprises: a storage portion adapted to temporarily store the first twistlock released from the first component to allow the first component to clamp the second twistlock.

19. The apparatus of claim 17, wherein the second component comprises: a storage portion adapted to temporarily store the first twistlock released from the first component to allow the first component to clamp the second twistlock.

* * * * *